Feb. 9, 1937.   A. W. CHAPMAN   2,070,468
ADJUSTABLE SEAT
Filed Oct. 30, 1933
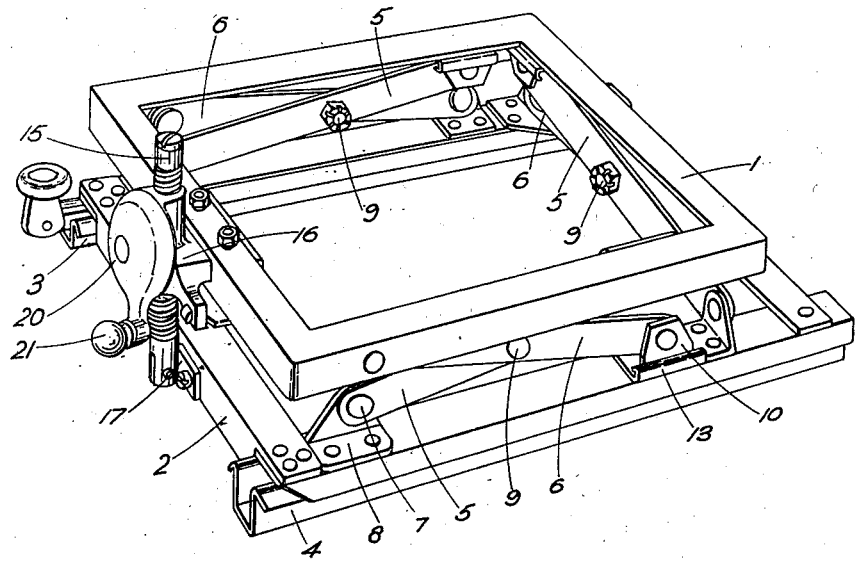
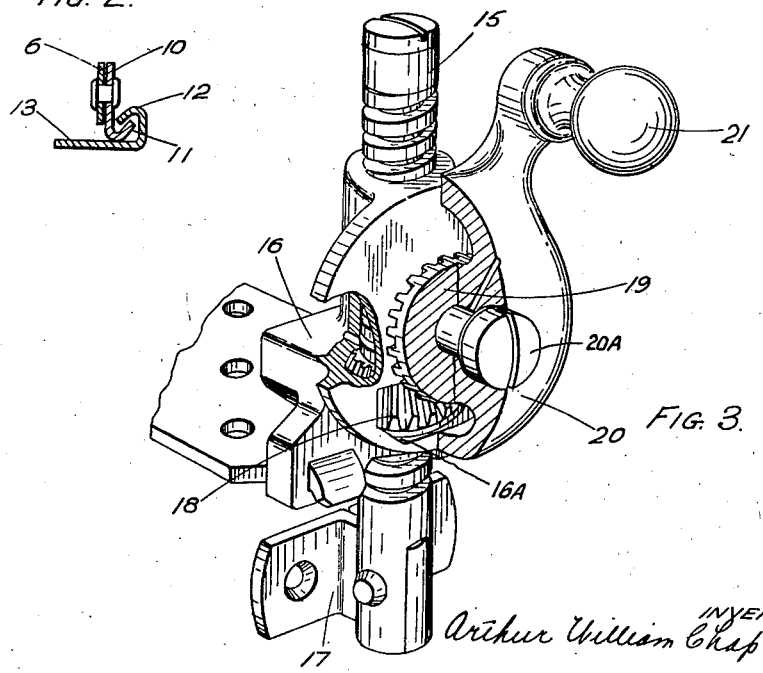

Patented Feb. 9, 1937

2,070,468

UNITED STATES PATENT OFFICE 2,070,468

ADJUSTABLE SEAT

Arthur William Chapman, Putney, London, England

Application October 30, 1933, Serial No. 695,917
In Great Britain November 3, 1932

5 Claims. (Cl. 155—91)

I have filed an application in Great Britain on the 3rd November 1932, No. 31,038.

The object of this invention is to provide seats which shall be adjustable in height and/or with respect to their angle or degree of tilt in relation to the horizontal and which shall be substantially rigid no matter into what position they have been adjusted. By the first mentioned kind of adjustment is meant that in which the front and rear edges of the seat or seat cushion are moved vertically, each through the same distance, the latter (or tilting adjustment) being performed by moving the said edges differentially or, alternatively, by moving one only of the edges whilst leaving the other to turn as upon a hinge.

The invention is particularly applicable to seats of various kinds, and will be specifically described hereinafter as applied to the seat or seat cushion of a vehicle. It will be appreciated, however, that the invention is also applicable to any member (e. g. a gun mounting or the body of a motor lorry) which has to be moved or tilted or pivoted relatively to a fixed support. The term "fixed support" or "fixed member" is used only to denote the relationship existing between the seat or other movable member and said fixed support or member and the term is intended to include constructions in which the fixed support or member is movable or slidable relatively to another member upon which it may be supported.

Expressed broadly, according to the present invention I provide a support for a seat, comprising a seat-supporting member which is adjustable towards and away from a fixed member either so that it is at all times parallel or substantially parallel to the fixed member and so that its sides are always in the same vertical planes no matter to what position it is adjusted, or so that the distance between its front edge or its front and rear edges and the corresponding edge or edges of the fixed member is progressively increased or decreased during the movement of the seat-supporting member, the amount of movement of the front and rear edges of the seat-supporting member towards and away from the corresponding edges of the fixed member being unequal if so desired, mechanism for interconnecting the said members and permitting their relative adjustment within a predetermined range of movement, and means for retaining the members in their adjusted positions and adapted to cooperate with said mechanism in order that a substantially rigid structure will be formed by the two members, the interconnecting mechanism and the retaining means in any of the adjusted positions occupied by the seat-supporting member.

For raising and lowering a seat which must always remain parallel to the fixed support and have its sides always in the same vertical planes, one set of pivoted levers may be arranged on one side of the seat construction and one on the other side. Each set may consist of two flat levers, pivoted together at their centres. Each lever is pivoted to the seat at one end and to the floor or support at the other end, and one of said ends will have a form of connection to provide sufficient sliding play between the said end and the seat or floor or support, as the case may be. I have found it most advantageous to use the line-contact sliding connection as described and claimed in the specification of my co-pending application No. 638,124, although, obviously, any other suitable slidable connection, such as a pin and slot, can be used.

When opened out, the two levers of a set of levers in such a construction resemble an X formation, one at either side of the seat, adapted to open out or close up in a vertical plane, and preferably capable of being folded together so that the two levers will take up no more room in height than the depth of one lever.

If so desired, the means for retaining the seat in its adjusted positions may also act as operating means for raising and lowering the seat. It may be of any convenient kind, provided it will act to hold the seat against any further movement until it is again brought into use to raise or lower the seat. It may also be located at the front or rear edge or at one side of the seat construction, either at the centre or offset from the centre towards one side or the other.

It is important to note that the expression "vertical" or "vertically", used herein in connection with the movement of the seat, is not intended to exclude constructions in which the seat, whilst still remaining parallel to the fixed member or support, is moved at an angle to the vertical.

Further constructional features of the invention will be described hereinafter.

Various constructional forms of the invention, as applied to the seats of motor vehicles, are shown, by way of example, on the accompanying sheet of drawings, whereon:—

Fig. 1 is a perspective view of one construction which is so arranged that the upper or seat-supporting frame is at all times parallel to a lower frame, the latter being slidably arranged upon floor slides.

Fig. 2 is a view, to a larger scale, showing the slidable connection of one end of one of the levers shown in Fig. 1 to the lower frame;

Fig. 3 is a view to a larger scale and partly in section of the combined retaining and operating mechanism used in the construction shown in Fig. 1.

Referring to Figs. 1, 2 and 3, this construction comprises a rectangular seat frame 1 of angular section arranged above a lower frame 2. In this particular construction, the lower frame 2 is slidably arranged upon two spaced slide members 3 and 4, secured to the floor of the vehicle. It will be appreciated, however, that the frame 2 could be secured directly to the floor if so desired. The seat frame 1 is operatively interconnected with the lower frame 2 by means of three sets of levers, each set comprising a pair of levers 5 and 6. As shown on the drawing, one set of levers is arranged on one side of the seat construction, another on the opposite side thereof and the third set at the rear of the seat construction.

To explain the connection of the sets of levers to the lower frame and the seat frame, it will be sufficient to describe the connection thereto of the set of levers which is nearest to the observer, as viewed in Fig. 1. Referring to this set of levers, it will be seen that the lower end of the lever 5 is pivotally connected at 7 to an angle bracket 8 which is secured on the top of the lower frame 2. The two levers 5 and 6 are pivotally connected centrally at 9. The lower end of the lever 6 is pivoted to a sliding bracket 10 having a hooked edge 11 which is engaged within the corresponding hooked edge 12 of a bracket 13 secured on the lower frame. The arrangement is thus such that the external convex edge formed at the junction of the vertical part of the bracket 10 and the turned-over edge 11 thereof, engages the upper surface of the bracket 13 with line contact, thus reducing the friction between the bracket 10 and the bracket 13 to a minimum. The upper end of the lever 6 is pivotally connected to the seat frame 1 and the upper end of the lever 5 is slidably connected to the seat frame by means of a line-contact slide and guide bracket, similar to the corresponding members used to slidably connect the lower end of the lever 6 with the lower frame. The above remarks also apply to the other two sets of levers, and it should be noted that the slidable ends of the two levers of each set of levers are adjacent to each other.

In this particular construction the means for retaining the seat frame 1 in any of its adjusted positions also acts as a means for bringing the frame into the said positions. It comprises a screwed rod 15 which is slidably supported in a bracket 16 secured to the seat frame 1 and is pivoted at its lower end to a bracket 17 fixed to the lower frame 2. The screwed rod has a bevel pinion 18 screw threaded thereon and housed in a slot 16A in the bracket 16, the said pinion being engaged by a bevel wheel 19 integral with a member 20 turnably mounted on a pin 20A screwed into the bracket 16. The operating member 20 is provided with an operating handle 21 which, when turned, causes the internally screwed bevel pinion 18 to be rotated through the bevel gear 19, the pinion moving axially along the rod 15. Thus, by virtue of the bevel pinion being threaded on to the rod 15 and housed in the bracket 16 on the seat frame, the latter will be raised or lowered according to the direction of rotation of the pinion 18 and the handle 21. The arrangement also forms a most efficient means for retaining the seat frame in any of its adjusted positions.

It will be appreciated that when the seat frame is being raised or lowered, the brackets 10 will slide relatively to the fixed brackets 13, the levers 5 and 6 of each set of levers being hinged about their central pivots 9.

Since the arms of the levers of each set of levers are equal, it follows that the seat frame 1 will at all times remain parallel to the lower frame 2 and, moreover, that the sides or edges of the seat frame will always remain in the same vertical planes, no matter to what position the frame is adjusted. Furthermore, it will be readily understood that a substantially rigid construction will be provided by the seat frame, the sets of interconnected levers and the combined operating and retaining means. For example, if a load is applied at or near one of the corners of the seat frame there will be no movement, or substantially no movement, either at that corner or at any of the other corners of the frame.

It should also be noted that as illustrated in Figure 1 the arrangement of the co-operating sets of levers is such that when the seat frame is lowered as far as it will go, the two levers of each set will collapse within the depth of one of them, and also within the depth of the seat frame, an arrangement which is obviously very advantageous.

I claim:

1. A seat support comprising a seat member adjustable towards and from a fixed member for sustaining the weight of the seat, sets of pivotally interconnected levers interconnecting the seat member to the fixed member, one set being arranged at one side of the seat member, another set at the opposite side of said member, and the third set on a side at right angles to said sides, pivotal and slidable means whereby the levers are connected to the seat member and to the fixed member, means connected to the seat member and to the fixed member on the side of said members opposite to the said side to which said third set of levers is connected, for adjusting the seat member with relation to the fixed member and operative in conjunction with the levers to fix the seat member against upward and downward movement and keep it substantially rigid in any of its positions of adjustment.

2. In a seat support, a seat member, a fixed member, pivotally connected means pivotally connected to the fixed member and to the seat member at opposed edges of the said members and assisting in supporting the seat member, and operating mechanism arranged adjacent an edge of the seat supporting structure at right angles to the aforementioned means for moving the seat member with relation to the fixed member and for fixing it in adjusted positions, said operating mechanism comprising a screw member interposed between the fixed member and the seat member, a nut rotatably mounted on the seat member and adjacent the edge thereof engaging the said screw operative to adjust one member with relation to the other, and pivotally connected levers having their ends pivotally connected to the fixed member and seat member at the edge opposite that occupied by the operating mechanism.

3. In a seat support according to claim 1, in which the last mentioned means comprises a bracket secured to the seat member, a screw rod slidably supported therein and pivotally connected at its lower end to the fixed member, and means on the bracket coacting with the screw for moving the bracket axially of the screw.

4. In a seat support according to claim 1, in which the last mentioned means comprises a bracket secured to the seat member, a screw rod slidably supported therein and pivotally connected at its lower end to the fixed member, a bevel pinion threaded on the screw, means for rotatably mounting the pinion in the bracket, and means for rotating the pinion to move it and the bracket axially of the screw.

5. In a seat support according to claim 1, in which the last mentioned means comprises a bracket secured to the seat member, a screw rod slidably supported therein and pivotally connected at its lower end to the fixed member, a bevel pinion threaded on the screw, means for rotatably mounting the pinion in the bracket, and a bevel toothed wheel rotatably mounted on the bracket engaging the bevel pinion for moving the bracket longitudinally of the screw.

ARTHUR WILLIAM CHAPMAN.